United States Patent Office 3,182,039
Patented May 4, 1965

3,182,039
FLUORINATED POLYMERS CONTAINING HYDRAZIDE GROUPS
David C. Remy, Madison, Wis., assignor to E. I. du Pont de Nemours and Company, Wilmington, Del., a corporation of Delaware
No Drawing. Filed Jan. 31, 1961, Ser. No. 85,998
4 Claims. (Cl. 260—72)

This invention relates to novel fluorinated polymers and more particularly to thermally stable fluorinated polymers containing hydrazide groups in the polymeric chain.

It is an object of this invention to provide novel thermally stable fluorinated polymers. A further object is to provide novel fluorinated polymers containing hydrazide groups in the polymeric chain. A still further object is to provide a process for the preparation of these polymers.

These and other objects of this invention are accomplished by the polymers which contain a plurality of units having the following structure

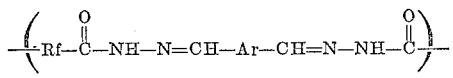

wherein Rf is a bivalent perfluoroalkylene radical having at least 3 carbon atoms and Ar is an aromatic hydrocarbon radical of from 6 to 18 carbon atoms which radical may be optionally substituted by alkyl radicals, alkoxy radicals or halogen atoms, with the residual valences on said aromatic hydrocarbon radical being on different carbon atoms. For purposes of the present invention, it is preferred that the perfluoroalkyl radical, Rf, contain from about 3 to 14 carbon atoms and that the alkyl and alkoxy substituents on the Ar radical be lower alkyl and lower alkoxy. The halogen substituents on the Ar radical include chlorine, bromine, fluorine and iodine.

The term "perfluoroalkylene radical" as used throughout the specification and claims, refers to an alkylene radical wherein all the hydrogen atoms have been replaced by fluorine atoms. A perfluoroalkylene radical correspondingly contains only carbon and fluorine atoms. The carbon atoms therein are joined by carbon-to-carbon single bonds and each fluorine atom therein is joined only to a carbon atom.

The polymers of this invention may be defined as being polymers having N-arylmethylene perfluoroacylhydrazide units. Representative examples of specific polymers within the scope of the present invention include polymers whose chains contain

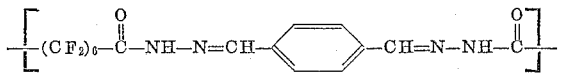

units and

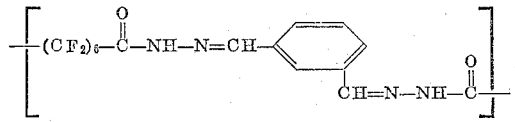

units.

Polymers having N-arylmethylene perfluoroacylhydrazide units are prepared by reacting equimolar amounts of an aromatic dialdehyde, such as isophthaldehyde (or terephthaldehyde or mixtures thereof) and perfluoroacyldihydrazides at atmospheric pressure in refluxing ethanol; optionally, the water formed may be removed by azeotropic distillation. This reaction may be illustrated as follows:

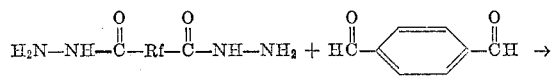

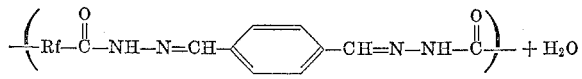

The progress of the reaction can be followed by measuring the amount of water obtained. The insoluble polymer product is collected by filtration after the reaction mixture has cooled. Alternatively, the reaction can be carried out by shaking the dialdehyde and the dihydrazide in a closed glass reaction vessel containing water, one or more inert organic solvents, and a small amount of polyvinyl alcohol. The insoluble reaction product is separated by conventional filtration procedures. In a representative procedure, 3 to 5 grams (total) of reactants, 50 milliliters of water, 50 milliliters of ethyl acetate (or a mixture of 30 milliliters of carbon tetrachloride and 20 milliliters of dimethyl formamide), and 0.25 gram of polyvinyl alcohol (whose 4% aqueous solution has a viscosity at 20° C. of 55–65 cp.) are added to a 4-ounce glass bottle, the bottle is capped and agitated for up to about 4 days; the polymer product subsequently is collected as a filter cake and is washed with water and dried.

Representative examples of aromatic dialdehydes which may be employed to prepare these novel polymers include terephthaldehyde; isoterephthaldehyde; 2,5-dichloroterephthaldehyde; 2,3,5,6-tetrachloroterephthaldehyde; 2,3,5-trichloroterephthaldehyde; 2,5-dibromoterephthaldehyde; 2,5-dimethylterephthaldehyde; 2,3,5,6-tetramethylterephthaldehyde; 2,5-dimethoxyterephthaldehyde; 2,5-diethoxyterephthaldehyde; 4-chloroisophthaldehyde; 2,4-dichloroisophthaldehyde; 2,4,6-trichloroisophthaldehyde; 2,3,4,6-tetrachloroisophthaldehyde; 4-methoxyisophthaldehyde; 5-methylisophthaldehyde; 4,5-dimethylisophthaldehyde; 4,6-dimethoxyisophthaldehyde; 2,3,4,6-tetramethoxyisophthaldehyde; 4,4'-diphenyldicarboxaldehyde and 4,4'-diphenyletherdicarboxaldehyde.

Representative examples of the perfluoroacyldihydrazides include dodecafluorosuberodihydrazide; hexafluoroglutarodihydrazide; octafluoroadipodihydrazide; hexadecafluorosebacodihydrazide and perfluoro-1,14-tetradecanedihydrazide.

The perfluoroacyldihydrazides themselves are made by adding the corresponding diesters in the conventional manner to hydrazine hydrate which is cooled by dry ice and serves as the solvent. In order to avoid polymer formation, at least 2 moles of hydrazine hydrate are required for every mole of diester. Generally, a much greater proportion is used. The precipitated product is collected by filtration. If desired, water can be added and the mixture extracted with a water-immiscible solvent; evaporation of the solvent from the extract gives residual dihydrazide.

The novel polymers of the present invention are thermally stable and are highly useful for increasing the viscosity of fluids at high temperatures. The fusible isoterephthaldehyde based polymers may, when molten, be pumped through jacketed reactors, condensers, heat exchangers, and pipes made of steel, stainless steel, glass, and other conventional materials for confining heat transfer media. The infusible terephthaldehyde based polymers may be mixed with the fusible polymers to increase their viscosity; empirical testing can be used to determine the optimum amount to be added for a particular application. The polymers of this invention can be added to the fusible products of my U.S. Patent Nos. 3,055,938 and 3,115,495, to increase their viscosity in a similar fashion. Thus the polymers of this invention can be used in equipment for molding plastic and rubber goods, processing paints, varnishes, and food products, fractionating petroleum, heating chemical process equipment, heating rotating drums and coating coils, and evaporating high boiling solvents.

The following examples will better illustrate the nature of the present invention; however, the invention is not intended to be limited to these examples. Parts are by weight unless otherwise indicated.

EXAMPLE 1

A. *Preparation of diethyldodecafluorosuberate*

Dodecafluorosuberic acid (325.1 grams) was dissolved in 500 milliliters of absolute ethanol, 3 milliliters concentrated sulfuric acid was added, and the solution was refluxed for 46 hours. The mixture was poured into two liters of water. The oily bottom phase was withdrawn, dried over magnesium sulfate, filtered, and distilled to give a yellow mobile oil. This distillate was then carefully distilled through an 8-inch Vigreux column to give 262.0 grams (75%) of diethyldodecafluorosuberate as a pale yellow oil; B.P. 104–111° C. (2.0–2.5 mm. Hg); $n_D^{25}$ 1.3446. An infrared spectrum showed bands at 3.35, 5.60 and 7.25$\mu$.

B. *Preparation of Dodecafluorosuberodihydrazide*

Into a round bottom flask equipped with a magnetic stirrer was placed a solution of 60 grams (0.135 mole) of the diester prepared above in 180 milliliters of ethanol and 25 milliliters of water. Hydrazine (12.8 grams, 0.4 mole) was added to the solution; after several minutes of stirring, the solution solidified to a pale-cream mush. The mixture was heated and additional ethanol was added until a homogeneous solution was obtained. After being refluxed for 30 minutes, the solution was cooled in ice, and the cream-colored precipitate removed by filtration. Recrystallization of this precipitate from ethanol gave 33.3 grams (56% yield) of dodecafluorosuberodihydrazide, M.P. 193.3–194.5° C. Infrared spectrum: 3.05, 3.15, 5.90, 6.09, 6.52$\mu$.

C. *Reaction of Dodecafluorosuberodihydrazide and terephthalaldehyde*

Into a 500 ml. 3-necked round-bottom flask equipped with a stirrer, thermometer and reflux condenser were placed 3.0483 grams (0.007290 mole) of dodecafluorosuberodihydrazide, 0.9778 gram (0.007290 mole) of terephthalaldehyde and 200 milliliters of absolute ethanol. While being stirred, the mixture was heated under gentle reflux at atmospheric pressure for 90 hours. The mixture was allowed to cool and was filtered. The white solid obtained in the filter funnel was dried to give 3.36 grams of polymer whose infrared spectrum ("Nujol" mull) showed absorption bands at 3.09, 3.26, 5.84, 6.20, and 6.41 microns. Inherent viscosity (0.1% solution in N-methyl-pyrrolidone at 30° C.); 0.13, 0.10. This polymer may be represented by the following structure:

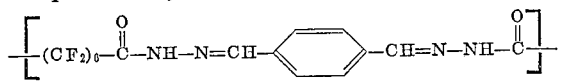

EXAMPLE 2

*Reaction of dodecafluorosuberodihydrazide and isophthalaldehyde*

Into a 500 milliliter 3-necked round-bottom flask equipped with a stirrer, thermometer and reflux condenser were placed 3.0479 grams (0.007289 mole) of dodecafluorosuberodihydrazide, and 0.9777 gram (0.007289 mole) of isophthalaldehyde in 200 milliliters of absolute ethanol. While being stirred, the mixture was heated under gentle reflux at atmospheric pressure for 90 hours. The mixture was allowed to cool; filtration then gave a while solid which weighed 0.81 gram after drying. Its infrared spectrum showed absorption bands at 3.10, 3.27, 5.85, 6.17, and 6.43 microns ("Nujol" mull). Inherent viscosity (0.1% in N-methyl pyrollidone at 30° C.): 0.13, 0.12. This polymer may be represented by the following structure:

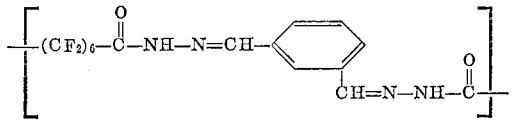

As many widely different embodiments of this invention may be made without departing from the spirit and scope thereof, it is to be understood that this invention is not limited to the specific embodiments thereof except as defined in the appended claims.

What is claimed is:

1. Normally solid fluorinated polymers consisting essentially of a plurality of units having the following structure

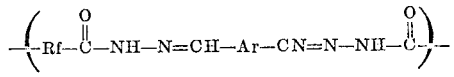

wherein Rf is a bivalent perfluoroalkylene radical having at least 3 carbon atoms and Ar is a bivalent aromatic hydrocarbon radical selected from the group consisting of a 6 to 18 carbon atom aromatic hydrocarbon radical, an alkyl substituted 6 to 18 carbon atom aromatic hydrocarbon radical and a halogen substituted 6 to 18 aromatic hydrocarbon radical.

2. Fluorinated polymers according to claim 1 wherein the perfluoroalkylene radical, Rf, contains from 3 to 14 carbon atoms.

3. A normally solid fluorinated polymer consisting essentially of units having the following structure

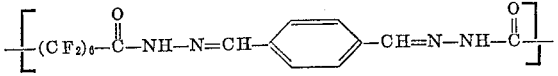

4. A normally solid fluorinated polymer consisting essentially of units having the following structure

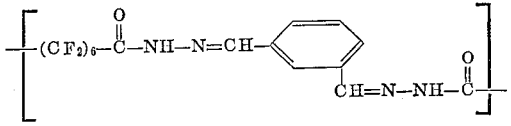

References Cited by the Examiner

UNITED STATES PATENTS

| 2,515,246 | 7/50 | McBee | 260—48 |
| 2,668,154 | 2/54 | Orth | 260—72 |
| 3,124,559 | 3/64 | De Witt | 260—72 |

FOREIGN PATENTS 601,364  7/60  Canada.

OTHER REFERENCES

Ser. No. 382,947, Bergk (A.P.C.), published Apr. 20, 1943.

WILLIAM H. SHORT, *Primary Examiner.*

P. E. MANGAN, *Examiner.*